TAPE APPARATUS

Filed Feb. 2, 1959 4 Sheets-Sheet 1

INVENTORS
RALPH G. CROMLEIGH
FRANK A. PAULUS
BY Christie, Parker & Hale
ATTORNEYS INVENTORS
RALPH G. CROMLEIGH
FRANK A. PAULUS
BY
Christie, Parker & Hale
ATTORNEYS INVENTORS
RALPH G. CROMLEIGH
FRANK A. PAULUS
BY
Christie, Parker & Hale
ATTORNEYS INVENTORS
RALPH G. CROMLEIGH
FRANK A. PAULUS
BY
Christie, Parker & Hale
ATTORNEYS 3,185,970
Patented May 25, 1965

3,185,970

TAPE APPARATUS

Ralph G. Cromleigh, Altadena, and Frank A. Paulus, Covina, Calif., assignors, by mesne assignments, to Consolidated Electrodynamics Corporation, Pasadena, Calif., a corporation of California Filed Feb. 2, 1959, Ser. No. 790,555
6 Claims. (Cl. 340—174.1)

This invention relates to tape apparatus and in one of its more particular aspects to correction means for magnetic tape apparatus wherein the tape and transducers are subject to being misaligned or skewed in relation to one another during a reading operation.

Information or data is presently being stored on various recording mediums in association with digital computers, industrial controls and the like. This information may be stored in coded form such as by the use of binary characters. The binary characters may be stored or packed at high densities on magnetic tape in a plurality of tracks wherein the individual binary characters comprising an information group or word are aligned transversely of the tape. The recording density is necessarily dependent on the resolving ability of the transducer and of the tape and the associated transducers. Even with the correct initial alignment of tape and transducers, misalignment of output data provided by the transducers results. The misaligned output data comes about due to differential flutter and the skewed relationship resulting between the tape and its associated transducers in relation to one another. The problem is particularly sever in high density systems utilizing, for example, twelve parallel recording tracks to record one information group or word as well as in digital recording systems utilizing six or seven parallel recording tracks. When there is a skewed relationship between the tape and the transducer, the transducers may be reading binary characters from two different information groups or words resulting in erroneous or unintelligible output data. Erroneous output data signals also result from the misalignment of the transducers or reading heads as a result of "gap scatter," in which the gaps of a plurality of transducers are not aligned due to manufacturing tolerances. Since recording at high densities is advantageous, skew correction means allowing high density recording is desirable.

This invention provides improved and more reliable tape apparatus including correction means connected to be responsive to the aligned or misaligned data from the transducers to produce a combination of aligned output data representative of a single information group or word. The correction means requires a minimum of circuitry and allows the data to be recorded at high densities and yet provide the correct aligned output data under skewed conditions. The magnetic tape apparatus disclosed has information groups recorded thereon in a plurality of longitudinally extending recording tracks and which information groups may comprise discrete signals coded in terms of binary characters transversely aligned on the tape relative to the recording tracks. The tape recording includes control data recorded thereon to control the reading out of the binary characters in a novel manner to provide the corrected aligned output data whether there is relative alignment or misalignment of the tape and transducers. The aligned output data will be provided by the correction means when the misalignment of the data varies up to approximately two words, thereby allowing the data to be recorded at high densities.

In the disclosed embodiment of the invention the magnetic tape is provided with three control data tracks. One of the control data tracks is arranged substantially centrally of the magnetic tape with a control data track arranged on opposite sides of this central control data track. The latter two mentioned control data tracks are preferably arranged substantially centrally of an outer edge of the magnetic tape and the central control data track whereby these control data tracks are utilized to align the binary characters recorded on the opposite sides of the central control data track. By arranging the magnetic tape in this fashion, each of the information groups or words are sub-divided into a plurality of binary characters so as to be controlled by an individual control data track and which latter tracks provide control signals for transferring the corresponding portion of each word to storage apparatus. These control data tracks are effective to provide aligned data when a skew of approximately one word exists. Upon aligning the portions of each word in this fashion, the central control data track is utilized to provide a control signal for reading out the complete word or information group from storage at a time when the stored data is representative of a single word to thereby provide an aligned group of binary characters.

This correction means comprises circuit means for delaying the application of the control data signals unique to each subdivided portion of the word to the storage apparatus for each track for a preselected interval. This preselected delay interval is arranged to provide a reference for the data tracks associated with the respective control data track whereby the angle of skew may vary within limits and yet allow each of the control data signals to be operative to align the binary characters for each portion of the same word. Accordingly, during the time that the binary characters of any one word are being read out by the transducing means, these binary characters are in turn stored in the respective track storage elements. Momentarily after the delayed control signals store portions of a word in this fashion, the undelayed central control signal is arranged for reading out the thus aligned data signals to provide the correctly aligned binary characters representative of a single word. This alignment action results whether or not a skewed relationship occurs between the tape and the transducing means.

These and other features of the present invention may be more fully appreciated when considered in the light of the following specification and drawings, in which.

Figure 1:
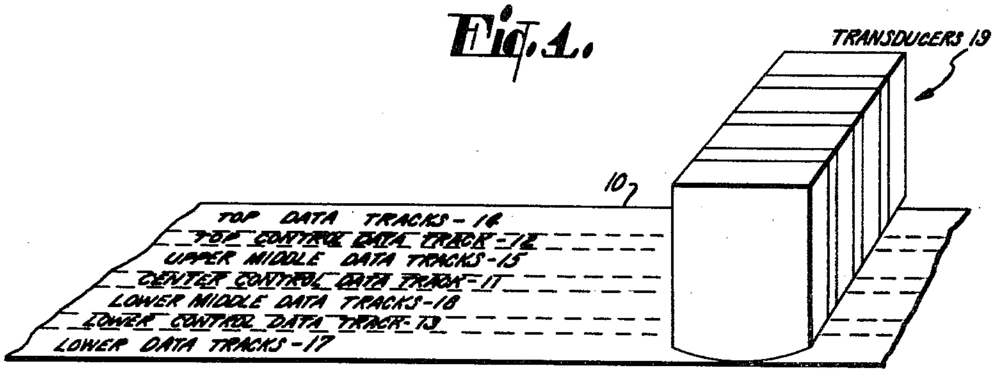
FIG. 1 is a fragmentary portion of tape and transducers showing a tape format and embodying the invention.

The format for the magnetic tape 10 will first be examined. The magnetic tape 10 is shown in FIG. 1 with a plurality of data recording tracks arranged longitudinally of the tape and in a coextensive parallel relationship. These data tracks include a plurality of control data tracks comprising a substantially central control data track 11 having a pair of control data tracks 12 and 13 arranged on opposite sides thereof for controlling the associated information-bearing portions of the magnetic tape 10, in this instance each half of the tape 10. To this end, a plurality of information-bearing data tracks identified in the drawings as the top data tracks 14 are indicated arranged between the topmost edge of the magnetic tape 10 and the control data track 12, while another plurality of data tracks identified as the upper middle data tracks 15 are arranged intermediate the control data track 12 and the central control data track 11. In this same fashion, lower middle data tracks 16 are arranged intermediate the center control data track 11 and the lower control data track 13, while a plurality of lower data tracks 17 are arranged intermediate the lower control data track 13 and the lower edge of the magnetic tape 10.

A plurality of transducers 19 for the magnetic tape 10 are arranged transversely thereof relative to the magnetic tape 10. The transducers 19 comprise a single transducer for each of the data tracks of the magnetic tape 10 and which transducers 19 may be a recording-reading head. The binary characters recorded on the magnetic tape 10 may be recorded on the tape 10 by any desired recording method; this invention, however, will be described in connection with the recording arrangement known as a "Non-Return-to-Zero" (NRZ) recording, and which method of recording is described in the text entitled "High Speed Computing Devices," by Engineering Research Associates, on page 331 thereof, published by McGraw-Hill Book Company, Incorporated, in 1950. Recording the data on the tape 10 in this fashion, the binary characters for any one information group or word are recorded on the magnetic tape 10 simultaneously along with the control data signals by means of the individual data track transducers 19.

Figure 3:
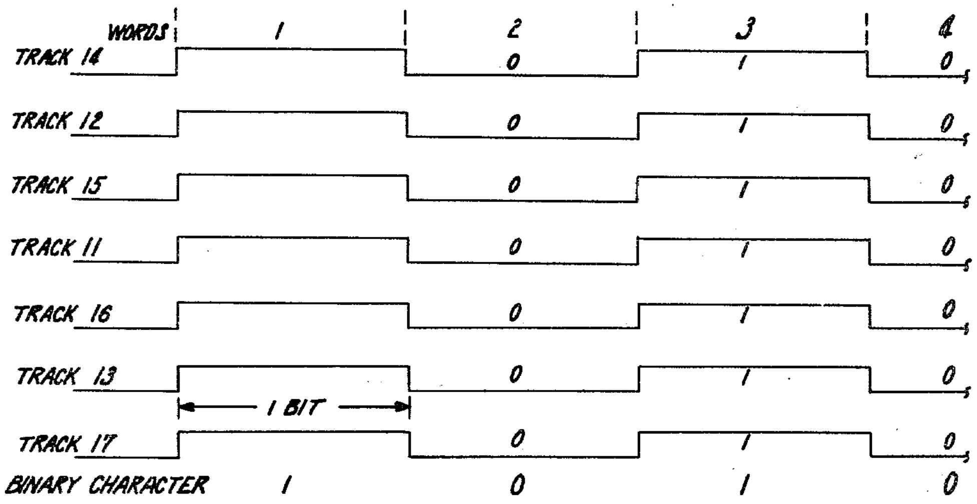
FIG. 3 is a graphical illustration of binary characters recorded in accordance with the format of FIG. 1.

As to the recorded data, the invention is more easily described by considering all data recorded in the recording tracks including the control data tracks 11, 12 and 13 as representative of alternate binary characters, or alternate binary "ones" and "zeroes." This recording arrangement will be seen to particularly simplify the description and illustration of the skewed relationship of the data on the tape 10 relative to the transducers 19. Such a pattern of binary characters is illustrated in FIG. 3 wherein only the recordings for the outer information-bearing tracks for the top data tracks 14, the upper middle data tracks 15, the lower middle data tracks 16 and the lower data tracks 17 relative to the control data tracks 12 and 13 are shown. It will be recognized that the information recorded in these outer tracks represents the extreme cases of skew, and any means for correcting the skew for these tracks will be operative to correct the skew for the tracks intermediate these tracks and their respective control data track 12 or 13. Therefore the description to follow will consider the data tracks 14, 15, 16 and 17 as comprising only a single track, with the understanding that in the practical form they may comprise a plurality of such tracks. It should be noted that only a single control data track is necessary for all of the plurality of data tracks comprising tracks 14 and 15 as long as a single binary character is provided for each controlled portion of a word. A word recorded on the magnetic tape 10 is considered as comprising the binary characters aligned transversely of the magnetic tape 10. In FIG. 3, for example, four words are illustrated and identified with each word comprising four binary characters. Word 1 is defined by the binary characters 1111, while word 2 comprises the binary characters 0000; word 3 is 1111, and the portion of the last word illustrated, word 4, is 0000.

Figure 2:
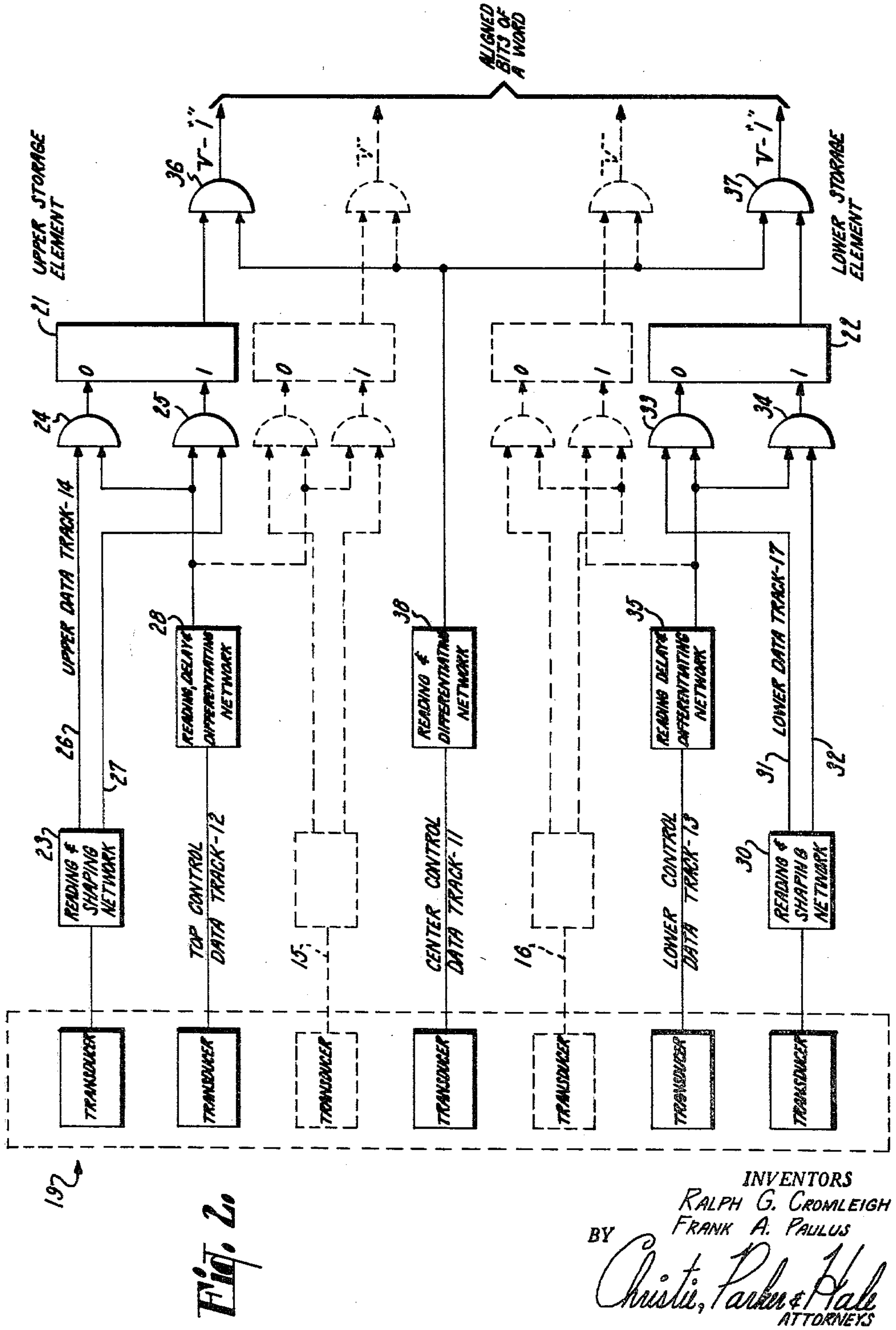
FIG. 2 is a block diagram of the correction means operative with tape of the type shown in FIG. 1.

Referring to FIG. 2, the circuitry provided for the skew correction means in accordance with this invention to produce the aligned binary characters of a single word will be described. The transducers 19 are illustrated with their individual control circuitry connected thereto. Once again, to simplify the illustration and description of the control circuitry, the number of recording tracks under consideration and accordingly the circuit means therefor has been reduced. The circuitry of FIG. 2 is shown for the outer information-bearing data tracks 14 and 17 only, along with the control data tracks 11, 12 and 13. The information-bearing data tracks 14 and 17 will be recognized as the recording tracks adjacent the outer edges of the magnetic tape 10 and which tracks will represent the extreme cases of misalignment or skew.

Each of the information-bearing data tracks described is provided with control means including a buffer or storage element such as the bistable storage elements 21 and 22 shown for the data tracks 14 and 17. The control means including the storage elements similar to the storage elements 21 and 22 for the information recorded in the data tracks 15 and 16 are indicated in FIG. 2 in dotted outline.

Now considering the circuitry intermediate the upper storage element 21 and the transducer of the transducers 19 individual to the top data track 14, it will be seen that a conventional reading and shaping network 23 is connected to the transducer for the data track 14 and which network is in turn coupled to the storage element 21 by means of a pair of logical AND circuits 24 and 25. The buffer or upper storage element 21 is illustrated as a conventional Eccles-Jordan flip-flop circuit having two input circuits and a single output circuit. The two input circuits are identified as the "zero" and "one" input circuits in conventional fashion, with the AND gate 24 controlling the "zero" input and the AND gate 25 controlling the "one" input. To this end the binary characters provided by the reading and shaping network 23 are individually coupled to the AND gates 24 and 25 depending on their binary value. The binary character "zero" is coupled to the AND gate 24 by means of the lead wire 26, while the binary "one" is coupled to the AND gate 25 by means of the lead wire 27. The AND gates 24 and 25 are further controlled by a control signal provided by the top control data track 12. This top control signal is coupled simultaneously to each of the AND circuits 24 and 25 through a conventional reading network 28, which in this instance includes a differentiating and delay arrangement.

The reading circuitry 28 differentiates the control data signals derived from the track 12 and delays the application thereof to the AND circuits 24 and 25 for a predetermined interval. This predetermined interval is arranged in accordance with this invention to be the time interval approximately equivalent to a one-half of a word time. The polarity of the control data signal provided from the network 28 is such as to be consistent with the low level logic utilized for the AND circuits 24 and 25. Accordingly, the control data signal will be effective to pass the binary character present at either the AND circuit 24 or 25 but not both through the respective AND circuit to the storage element 21 to record the corresponding binary character therein. When the binary character represents a binary "zero," the control signal will gate this "zero" through the circuit 24 to set the storage element 21 to the zero state, and when the detected binary character is a "one," the signal derived from the AND circuit will set the storage element in the corresponding "one" state.

In the same fashion, the transducer for the lower data track 17 is provided with a reading and shaping network 30 having a pair of output lead wires 31 and 32, for the binary characters "zero" and "one" respectively, connected to the AND circuits 33 and 34, to control the "zero" and "one" input circuits for the lower storage element 22. These AND circuits 33 and 34 are also provided with an individual control data signal derived from the control data track 13 and applied thereto by means of a reading, delay and differentiating network 35 similar to the above described network 28. The time delay provided by the reading arrangement 35 is also of a one-half word length time duration and which delayed signals will correspondingly gate out the binary character "zero" or "one" to the respective input circuit for correspondingly setting the storage element 22.

The plurality of buffer storage elements provided for the information-bearing data tracks are each read out by means of AND circuits similar to the AND circuits 36 and 37 respectively provided for the storage elements 21 and 22. These AND circuits 36 and 37 are connected to be responsive to the output indication appearing on the "one" output circuits for the storage elements 21 and 22. These AND circuits 36 and 37, as well as the AND circuits for the remaining data recording tracks, are also connected to be responsive to the central control data signal derived from the central control data track 11 and which control signal is coupled to the AND circuits 36 and 37 substantially simultaneously. A reading and differentiating network 38 is coupled intermediate the transducer for the control data track 11 and the AND circuits 36 and 37. It should be noted that the reading network 38 does not include a delay arrangement so that the central data signal is coupled to the AND circuits 36 and 37 in a time sequence of approximately one half word after the delayed control signals are applied. The pulse representative of the central data track 11 will gate out the information stored in the elements 21 and 22 substantially simultaneously so that the signals appearing at the outputs of the AND circuits 36 and 37 will represent the information stored in elements 21 and 22 and to thereby provide the aligned binary characters of a single word.

Figure 4:
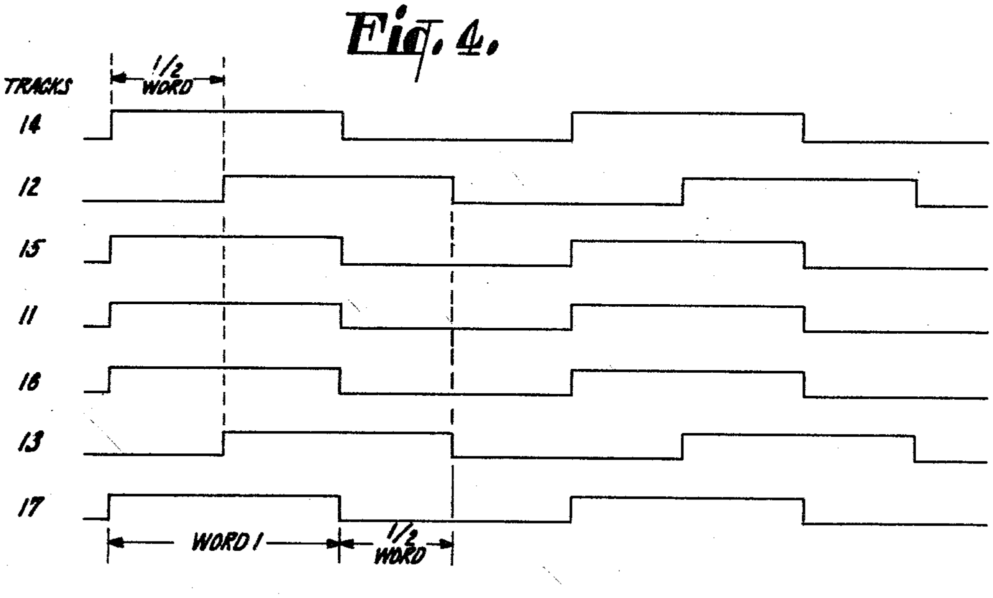
FIG. 4 is a graphical illustration of the reproduced binary characters recorded as shown in FIG. 3 and showing the delayed relationship of the control data tracks.
Figure 5:
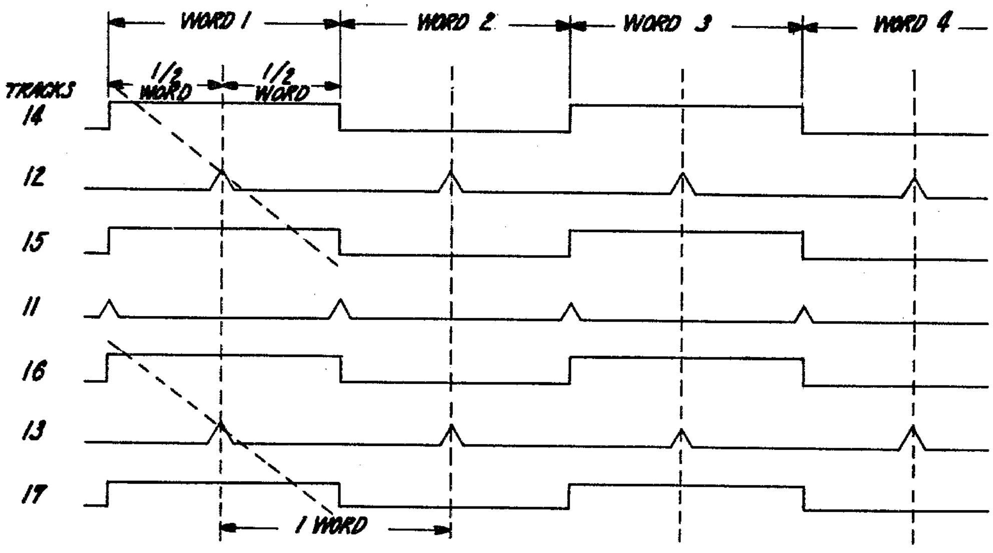
FIG. 5 is a graphical illustration of the reproduced binary characters of FIG. 4 and showing the control data signals converted into control pulses.

The operation of the tape apparatus when there is no misalignment or skew between the tape 10 and the transducers 19 will first be examined in connection with FIGS. 4 and 5. In FIG. 4, the reproduced signals or signals played back from the magnetic tape 10 for the various recording tracks under consideration in FIG. 2 are shown with the control data signals for the tracks 12 and 13 shown in their delayed relationship as they would appear after passing through the respective networks 28 and 35 before having been differentiated. This same arrangement is shown in FIG. 5, but with the control data signals derived from the tracks 12 and 13 shown in their differentiated relationship.

The control data signals derived from the tracks 11 and 13 are shown substantially centrally of the signal representative of the corresponding binary character for the particular word, that is, the top control data signal is effective to read out the binary character for each data track in the top half of the magnetic tape 10. Considering this arrangement, after the arrival of the reproduced binary characters 11 for word one at the AND circuits 25 and 34 approximately a half a word length time thereafter, the control signals from the networks 28 and 35 will be coupled to each of the AND circuits 24, 25, 33 and 34. Since the binary information detected by the transducers 19 represents a pair of binary "ones," only these signals will be passed to the storage elements 21 and 22 by means of AND circuits 25 and 34. Accordingly, the control data signals will gate through the binary "ones" by means of the AND circuits 25 and 34, while the corresponding AND circuits 24 and 33 will not provide an output signal to their storage elements 21 and 22 since at this time their remaining input circuit has a high level signal appearing thereon. With the storage elements 21 and 22 both set into the "one" state, the corresponding "one" output indications coupled to the AND circuits 36 and 37 are at a low voltage level. Following the setting of the storage elements 21 and 22 in this fashion and approximately a half a word length later the control signal from the track 11 is coupled to the AND circuits 36 and 37 so as to provide a pair of aligned signals representative of the binary information 11 from the AND circuits 36 and 37 and which signals represent the detected information stored on the magnetic tape 10.

It should be noted at this point that the control data signals derived from the control data tracks 12 and 13 are arranged to occur substantially centrally during a word time, so that when a skewed relationship exists the particular control signal will read out a binary character for a single word as long as the skew from the top data track 14 to the upper middle data track 15, for example, is less than one word. The dotted line shown in FIG. 5 indicates the possible maximum angle of skew for tracks 14 and 15 relative to the top control signal as approximately this one word length. Similarly, the skew for the lower middle data track 16 and the lower data track 17 should be less than one word. Stated differently, the control data signal derived from the track 12 can be considered as a reference for all the information-bearing data tracks included between the tracks 14 and 15, while the control data signal derived from the data track 13 similarly serves as a reference for the information-bearing data tracks included between the data tracks 16 and 17. These two mentioned control data tracks are utilized in accordance with this invention to first align the two portions or two halves of the magnetic tape 10, and these aligned portions are then read out by means of the central control signal derived from the data track 11 to provide the correctly aligned information group representative of a single word. It will now be evident that a requirement of this method of skew correction is that the skew for each half of the magnetic tape 10 be approximately one word and the overall skew from the top data track 14 to the lower data track 17 be within two words. The skew between control tracks 12 and 13 is therefore limited to about one word.

Figure 6:
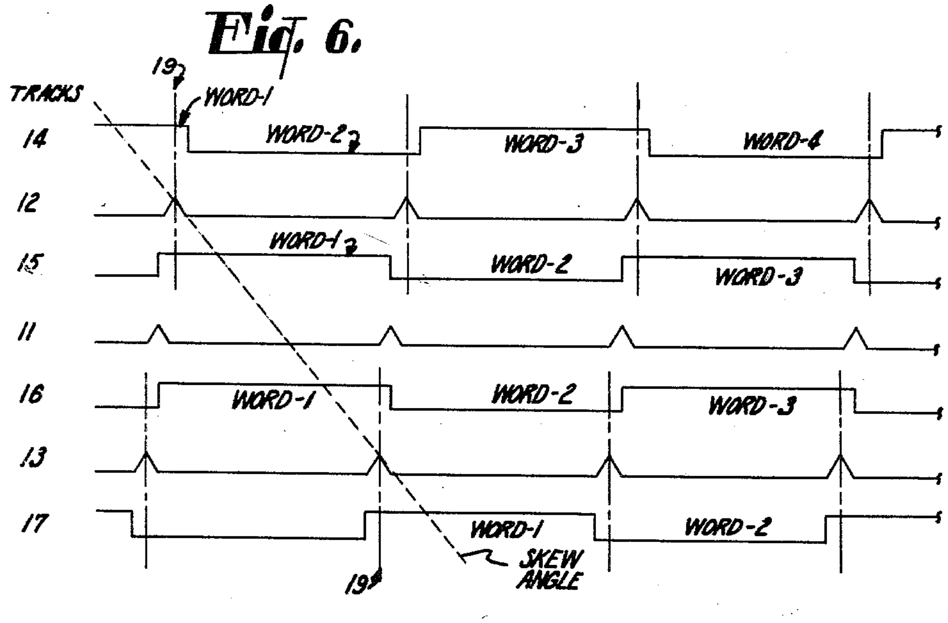
FIG. 6 is a graphical illustration of the reproduced data of FIG. 3 shown as an extreme case of misalignment.

The operation of the invention during an interval in which there is a relative skew or misalignment of the magnetic tape 10 and the transducers 19 in an extreme case, about two words, as illustrated in FIG. 6, will now be considered. The wave forms shown in FIG. 6 are illustrated with the transducers 19 in a fixed position and which wave forms are located in accordance with the skew angle shown. The dotted line representing the skew angle is seen to pass through the same word on each recording track, namely word 1. Considering the top half of the magnetic tape 10, the transducers 19 are considered to be located relative to the data signals for this half of the magnetic tape 10, at the position indicated by the dot-dash line passing through the top control data signal and intersecting the dotted line representing the angle of skew. By carefully examining FIG. 6 it will be noted that the binary "one" for word 1 will appear at the AND circuit 25 at the time the control data signal from the track 12 arrives there, and also that the binary "one" for word 1 detected by the transducers for the middle data track 15 appears at its associated AND circuit at this time. Therefore these two binary "ones" will be simultaneously recorded in their individual storage elements, such as recording the signal from track 14 in the element 21. The skewed relationship of the two binary "ones" for the tracks 14 and 15 will now be seen to have been corrected and that the misalignment of this half of the tape 10 has been corrected.

In the same fashion, the skew correction for aligning the bottom half of the tape 10 will be described. In this instance, the two binary "ones" of word 1 recorded in the tracks 16 and 17 are shown in FIG. 6 with the transducers 19 at this same time considered to be located at the position shown at the bottom half of the FIG. 6 along the dot-dash line intersecting the dotted skew angle line. It will be seen that the control signal from the track 13 will occur while the binary "one" for the track 16 coexists and will also occur just prior to the termination of the binary "one" for word 1 recorded on the track 17. This coincidental application of the binary "ones" and the data signal for track 13 will set the storage elements for the lower half of tape 10, such as the element 22, to the binary "one" state.

Figure 7:
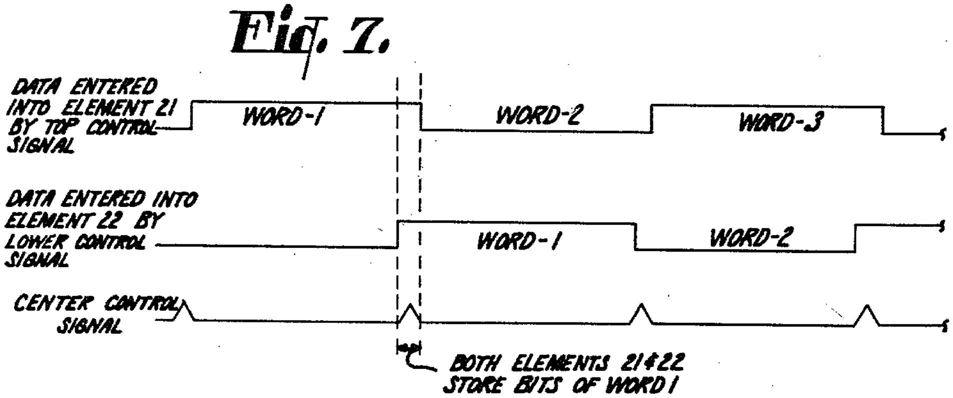
FIG. 7 is a graphical illustration of the relationship of the initially aligned portions of the data of FIG. 6 and the central control signal.

Having aligned the two halves of the tape 10, it is now only necessary to read out the aligned portions of the magnetic tape 10 from the elements 21 and 22 at an interval in which both of these elements store the binary characters representative of the same word. Since, as indicated hereinabove, the top and the lower control data signals derived from tracks 12 and 13 cannot skew by as much as a word apart, there is a finite time when the contents of both elements 21 and 22 represent a complete word, and it is during this finite time interval that the central control signal derived from track 11 is arranged to read out the information from the elements 21 and 22. The finite time interval required for reading out the contents of the elements 21 and 22 to provide the correctly aligned output signals may be better appreciated from viewing FIG. 7. In FIG. 7 the data entered into the elements 21 and 22 and their relative time relationship with the central control signal is illustrated. In will be seen from examining FIG. 7 that the binary "one" for word 1 recorded in the element 21 will overlap in time the interval in which the binary "one" for word 1 is stored in the element 22. Accordingly, during this finite time interval it is desired that the central control signal occur to read out these elements 21 and 22. To better appreciate that the central control data signal does occur during this momentary overlap in storage times for a single word, reference should be made to FIG. 3, wherein it will be seen that the central clock track 11 is recorded so that signals therein occur in phase with the signals recorded in the upper and lower middle data tracks 15 and 16. Therefore, when there is tape skew, the central control track 11 will always occur between the beginning of one middle data signal and the other, in a time relationship as indicated in FIG. 7. Accordingly, the result of applying the center control signal to the AND circuits 36 and 37 is that the binary characters for word 1 are read out and are aligned. In the same fashion the aligned or misaligned characters for words 2, 3, 4, etc., are provided as aligned information groups from the AND circuits 36 and 37.

Although the invention has been described in connection with logical circuitry of a low level type, it will be understood that high level logic is equally applicable, as is well known. Also, the method of recording the data in a continuous fashion is not a limitation of this invention, since the data may be recorded in block form separated by gaps, as is used in computer tape systems.

What is claimed is:

1. In tape apparatus including tape having a plurality of data recording tracks thereon and a plurality of control data recording tracks, said plurality of control data recording tracks including a substantially centrally recorded control data track and a control data track recorded and arranged to sub-divide in half the recording tracks on opposite sides of said central control track, each of said recording tracks having binary coded signals comprising a word and the control data therefor recorded in alignment thereon, transducing means for reading each of the recording tracks of said tape and transversely aligned thereon for reading the tracks substantially simultaneously, said transducing means and said tape being subject to transverse misalignment whereby the binary coded data signals comprising a word derived from said transducers are misaligned, individual correction means connected to said transducing means and responsive to the aligned or misaligned data signals from each of said halves of the tape in combination with the respective control data signal for aligning the signals on each half of the tape, and circuit means responsive to each of the thus aligned signals in combination with the central control signal to produce aligned output combinations of signals comprising a single word.

2. In magnetic tape apparatus having magnetic tape and magnetic reading apparatus cooperatively arranged for reading information groups comprising a plurality of signals stored on said tape, said magnetic tape having a plurality of longitudinally extending data recording tracks arranged for storing an information group transversely of said tape with the signals thereof aligned in a plurality of said tracks, a first control data recording track arranged on said tape substantially centrally of said first mentioned data tracks and having a recorded control data signal for each information group, a pair of control data tracks each arranged substantially centrally of said first control data track and one of the outer edges of said tape for controlling the data recording tracks individual thereto, said tape and said reading apparatus being subject to a skewed relationship during a reading operation whereby the signals of an information group are misaligned, and circuit means for each of said information tracks responsive to the information signals recorded therein in a preselected combination with each of the said individual control signals provided by said reading apparatus to align any misaligned signals of a single information group, said circuit means including means for delaying the arrival of said control signals derived from said pair of control data tracks at said circuit means at a preselected interval whereby the subsequently occurring control signal derived from said first control data track provides the output signals from said circuit means representative of a single information group.

3. In tape apparatus including tape having a plurality of data recording tracks thereon and a plurality of control data recording tracks, said plurality of control data recording tracks including a substantially centrally recorded control data track and at least a single control data track recorded and arranged to sub-divided the recording tracks on opposite sides of said central control track, each of said recording tracks having binary coded signals comprising a word and the control data therefor recorded in alignment thereon, transducing means for reading each of the recording tracks of said tape and transversely aligned thereon for reading the tracks substantially simultaneously, said transducing means and said tape being subject to transverse misalignment whereby the binary coded data signals comprising a word derived from said transducers are misaligned, circuit means including storage means controllably responsive to the binary coded data signals provided by said transducers from each of said data recording tracks, individual control circuit means including time delay means responsive to the binary coded control signals provided by said transducers from each of said control data tracks on opposite sides of said central control data track for rendering each of said storage means responsive to the binary coded data signals, and control circuit means responsive to the binary coded signals provided by said central control data track in combination with the output storage indication for each of said storage element for providing an output indication of the contents of the storage means.

4. In tape apparatus including tape having a plurality of data recording tracks thereon and a plurality of control data recording tracks, said plurality of control data recording tracks including a substantially centrally recorded first control data track and second and third control data tracks recorded and arranged to sub-divide the recording tracks on opposite sides of said first control track, each of said recording tracks having binary coded signals comprising a word and the control data therefor recorded in alignment thereon, transducing means for reading each of the recording tracks of said tape and transversely aligned thereon for reading the tracks substantially simultaneously, said transducing means and said tape being subject to transverse misalignment whereby the binary coded data signals comprising a word derived from said transducers are misaligned, bistable storage means for storing each of the signals derived from said data recording tracks, first control circuit means for each of said storage means connected to be responsive to the individual data signal from said data recording tracks in combination with the first or second control data signal individual to the sub-divided portion of said tape, means for delaying the application of each of the second and third control data signals to said control circuit means approximately one-half word time whereby the aligned or misaligned data signals are storing in said storage means substantially simultaneously, and second control circuit means responsive to the storage condition of said storage means in combination with the first control data signal for providing an output combination of aligned signals, said first control data signal being arranged to occur during an interval each of said storage means is storing signals comprising a single word.

5. In tape apparatus as defined in claim 4 wherein said apparatus is magnetic tape apparatus and said first and second control circuit means comprise "and" circuits.

6. In tape apparatus including tape having a plurality of data tracks each for recording bits of data in transverse storage locations and a plurality of control data tracks recorded thereon, said control data tracks including a control data track arranged substantially centrally of the tape and a control data track arranged on opposite sides of said central control data track, said control data tracks being spaced apart by at least a single data track, transducing means for said tape operative upon the production of relative motion between said tape and said transducing means for producing a transducing operation, said tape and said transducing means being further characterized as being subject to misalignment during a transducing operation, and correction means connected to said transducing means and responsive to the aligned or misaligned bits of data in combination with the control data derived from said transducing means in a predetermined time relationship to produce aligned bits of data in parallel.

References Cited by the Examiner

UNITED STATES PATENTS

| | | | |
|---|---|---|---|
| 2,793,344 | 5/57 | Reynolds | 340—174 X |
| 2,813,259 | 11/57 | Burkhart | 340—174.1 |
| 2,850,234 | 9/58 | Bartell | 340—745 X |
| 2,937,239 | 5/60 | Garber et al. | 179—100.2 |
| 2,948,884 | 8/60 | Guerber et al. | 340—174.1 |
| 3,064,242 | 11/62 | Hill et al. | 340—174.1 |

FOREIGN PATENTS

| | | |
|---|---|---|
| 762,699 | 12/56 | Great Britain. |

IRVING L. SRAGOW, *Primary Examiner.*

EVERETT R. REYNOLDS, STEPHEN W. CAPELLI, *Examiners.*

UNITED STATES PATENT OFFICE

CERTIFICATE OF CORRECTION

Patent No. 3,185,970 May 25, 1965

Ralph G. Cromleigh et al.

It is hereby certified that error appears in the above numbered patent requiring correction and that the said Letters Patent should read as corrected below.

Column 8, line 49, for "element" read -- means --.

Signed and sealed this 7th day of December 1965.

(SEAL)
Attest:

ERNEST W. SWIDER
Attesting Officer

EDWARD J. BRENNER
Commissioner of Patents